United States Patent
George et al.

(10) Patent No.: US 8,623,114 B2
(45) Date of Patent: Jan. 7, 2014

(54) COPPER ANODE REFINING SYSTEM AND METHOD

(75) Inventors: David B. George, Salt Lake City, UT (US); Arsenio C. Enriquez, Jr., West Jordan, UT (US); Adrian Christian Deneys, Danville, CA (US); William John Mahoney, East Aurora, NY (US); Ian Francis Masterson, Noblesville, IN (US); Stephen Manley, Spring, TX (US); Jesse Cates, Brownsburg, IN (US); Kevin Albrecht, Brownsburg, IN (US)

(73) Assignee: Praxair Technology, Inc., Danbury, CT (US)

( * ) Notice: Subject to any disclaimer, the term of this patent is extended or adjusted under 35 U.S.C. 154(b) by 248 days.

(21) Appl. No.: 13/027,843

(22) Filed: Feb. 15, 2011

(65) Prior Publication Data

US 2012/0036963 A1 Feb. 16, 2012

Related U.S. Application Data

(60) Provisional application No. 61/305,008, filed on Feb. 16, 2010.

(51) Int. Cl.
*C22B 7/00* (2006.01)
*C22B 15/14* (2006.01)

(52) U.S. Cl.
USPC .............................................. 75/414; 75/649

(58) Field of Classification Search
USPC ................................................ 75/649, 414
See application file for complete search history.

(56) References Cited

U.S. PATENT DOCUMENTS

| | | | |
|---|---|---|---|
| 3,258,330 A * | 6/1966 | Ito | 75/649 |
| 3,623,863 A * | 11/1971 | Henderson et al. | 75/648 |
| 3,902,895 A | 9/1975 | Wuth | |
| 4,009,240 A * | 2/1977 | Koenig | 423/210 |
| 4,444,586 A * | 4/1984 | Bienus et al. | 75/638 |
| 4,469,513 A | 9/1984 | Staib | |
| 4,657,586 A | 4/1987 | Masterson et al. | |
| 4,661,152 A | 4/1987 | Kimura et al. | |
| 4,754,951 A | 7/1988 | Masterson et al. | |
| 4,830,667 A | 5/1989 | Marcuson et al. | |
| 5,180,423 A | 1/1993 | Marcuson et al. | |
| 5,215,571 A | 6/1993 | Marcuson et al. | |
| 5,599,375 A * | 2/1997 | Gitman | 75/10.42 |
| 5,658,368 A | 8/1997 | Diaz et al. | |

(Continued)

FOREIGN PATENT DOCUMENTS

CA 1042207 11/1978
WO WO 2007/092219 A1 8/2007

*Primary Examiner* — George Wyszomierski
*Assistant Examiner* — Tima M McGuthry Banks
(74) *Attorney, Agent, or Firm* — Donald T. Black

(57) ABSTRACT

A method and system for the copper anode refining is provided in which coherent jet technology is employed to heat the molten blister copper and/or melt scrap copper charges using a melting flame, oxidize the sulfur in the molten blister copper, and reduce the oxygen in the molten blister copper using top-blown coherent jet gas streams from one or more multi-functional, coherent jet lance assemblies. The present system and method employs a microprocessor-based controller operatively controlling the flow of an oxygen-containing gas, an inert gas, a reducing agent and a fuel to the coherent jet lance. The disclosed copper anode refining system and method greatly improves copper production while lowering oxidation/reduction cycle times and minimizing $NO_x$ emissions.

11 Claims, 6 Drawing Sheets

(56) References Cited

U.S. PATENT DOCUMENTS

| | | | |
|---|---|---|---|
| 5,820,816 A | * | 10/1998 | Hicks .......................... 266/217 |
| RE36,598 E | | 3/2000 | George |
| 6,171,544 B1 | * | 1/2001 | Anderson et al. ............... 266/47 |
| 6,210,463 B1 | | 4/2001 | George et al. |
| 6,403,043 B1 | | 6/2002 | Utigard et al. |

* cited by examiner

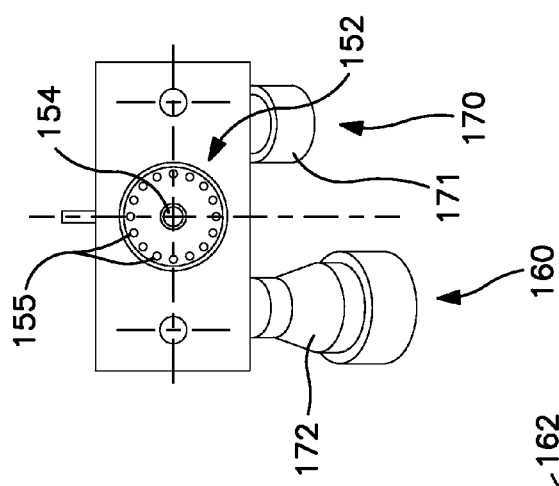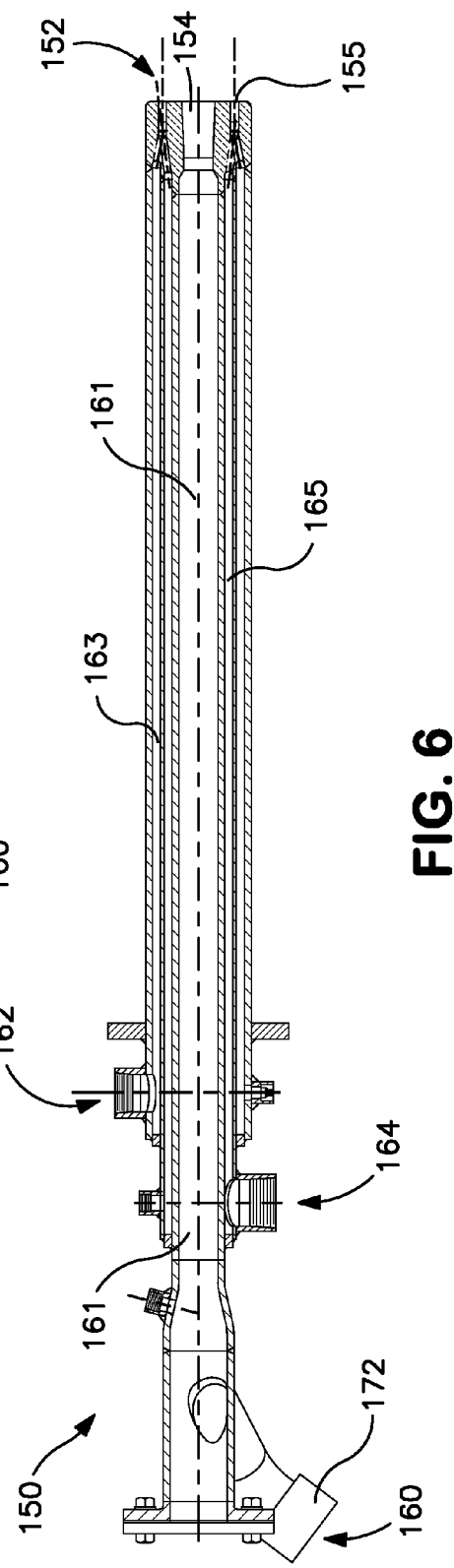

COPPER ANODE REFINING SYSTEM AND METHOD

CROSS REFERENCE TO RELATED APPLICATIONS

This patent application claims priority to U.S. provisional patent application Ser. No. 61/305,008 filed Feb. 16, 2010, the disclosure of which is incorporated by reference herein.

FIELD OF THE INVENTION

The present invention relates to the pyrometallurgical treatment of copper-containing materials with process gases, such as oxidizing and reducing process gases, to convert such materials to copper-containing materials of higher value. More particularly, the present invention relates to the anode refining of molten blister copper to remove sulfur, oxygen and other impurities by the selective treatment of the molten blister copper with coherent gas streams of oxidizing and reducing process gases.

BACKGROUND

The production of copper typically involves a multi-step procedure which includes concentration, smelting, converting, refining, anode casting and electrolytic refining procedures. Typically, starting with an ore comprising one or more of a copper sulfide or copper-iron-sulfide mineral, such as chalcocite, chalcopyrite and bornite, the ore is converted to a concentrate containing usually between 25 and 35 weight percent (wt %) copper. The concentrate is then converted with heat and oxygen first to a matte and then to blister copper. Additional solid copper scrap is often added to the blister copper. The further refining of the blister copper accomplishes the reduction of oxygen and sulfur impurities in the blister copper, typically from levels as high as 0.80% and 1.0%, respectively, to levels as low as 0.05% and 0.002%, respectively and is usually carried out in the temperature range of about 1090° C. (2000° F.) to 1300° C. (2400° F.) and includes an oxidation process to oxidize sulfur to sulfur dioxide which desolubilizes out of the bath as well as a reduction process to remove dissolved oxygen present after the oxidation step.

The refining of the blister copper to anode copper may be conducted as a batch process or semi-continuous process. In either case, high velocity submerged tuyeres are typically used for the injection of the oxidant gas and reductant gas streams into the copper melt. However, numerous operational difficulties and significant costs are associated with conventional copper anode fire refining process and injection of the oxidant and reductant gas streams via submerged tuyeres. Such difficulties include: tuyere maintenance and reliability concerns; high furnace refractory wear due to the corrosive effects of the oxidant and reducing gases; excessive $NO_x$ formation, and refining process variations.

What is needed is an improved copper anode refining method that eliminates the need for submerged tuyeres and which achieves high refining efficiencies and throughput while at the same lowering operational costs and achieving reductions in the levels of $NO_x$ associated with copper anode refining process.

The presently disclosed system and method of copper refining with coherent gas streams includes multiple features and aspects that alone and collectively enhance the copper refining process from a productivity and environmental standpoint. These inventive aspects and features are presented in more detail in the sections that follow.

SUMMARY OF THE INVENTIONS

In one aspect, the present invention may be characterized as a method for the refining of anode copper comprising the steps of: (i) providing molten blister copper to a furnace; (ii) charging copper scrap to the molten blister copper in the furnace; (iii) melting said copper scrap or heating the molten blister copper using a melting flame produced from a top blown, multi-functional coherent jet lance; (iv) oxidizing sulfur impurities in the molten blister copper in the furnace using a top-blown, coherent oxygen-containing gas stream ejected from the coherent jet lance, said coherent jet lance coupled to the oxygen-containing gas source and the fuel source; and (v) reducing oxygen in the molten blister copper in the furnace using a top-blown, coherent reducing gas stream containing a reducing agent and an inert gas ejected from the coherent jet lance.

In another aspect, the present invention may be characterized as a system for copper anode refining comprising: a copper metallurgical furnace having a refractory wall, the furnace adapted to contain a bath of molten copper having a top surface and said furnace defining a headspace above the top surface of the copper bath; at least one multi-functional, coherent jet lance connected to sources of oxygen-containing gas, inert gas, reducing agent and fuel, said coherent jet lance mounted in said furnace refractory wall at a location above the top surface of the copper bath; and a controller operatively controlling the flow of oxygen-containing gas, inert gas, reducing agent and fuel to the at least one coherent jet lance. The multi-functional, coherent jet lance is adapted to provide a melting flame to heat the molten copper or melt any scrap copper charges provided to the furnace; a coherent oxygen-containing gas stream to oxidize sulfur in the copper bath; and a coherent reducing gas stream containing the reducing agent and the inert gas to reduce oxygen in the copper bath.

In another aspect, the present invention may be characterized as a an improvement to the method for continuous refining of copper in an anode furnace. The improvement comprises the steps of: (i) providing molten blister copper to the anode furnace and optionally charging copper scrap to the molten blister copper in the anode furnace; (ii) oxidizing sulfur impurities in the molten blister copper in the anode furnace using a top-blown, coherent oxygen-containing gas stream ejected from a coherent jet lance mounted in a refractory wall of the anode furnace at a location above the top surface of the molten blister copper; and (iii) reducing oxygen in the molten blister copper in the anode furnace using a top-blown, coherent reducing gas stream containing a reducing agent and an inert gas ejected from the coherent jet lance.

BRIEF DESCRIPTION OF THE DRAWINGS

The above and other aspects, features, and advantages of the present invention will be more apparent from the following, more detailed description thereof, presented in conjunction with the following drawings, wherein:

FIG. 2A is an isometric view of a prior art coherent jet lance assembly disposed within a water cooled housing, whereas

FIG. 5 is a cross-sectional end view of an alternate embodiment of the coherent jet lance assembly; and FIG. 6 is a cross-sectional longitudinal view of the alternate embodiment of coherent jet lance assembly of FIG. 5.

DETAILED DESCRIPTION

Figure 1:
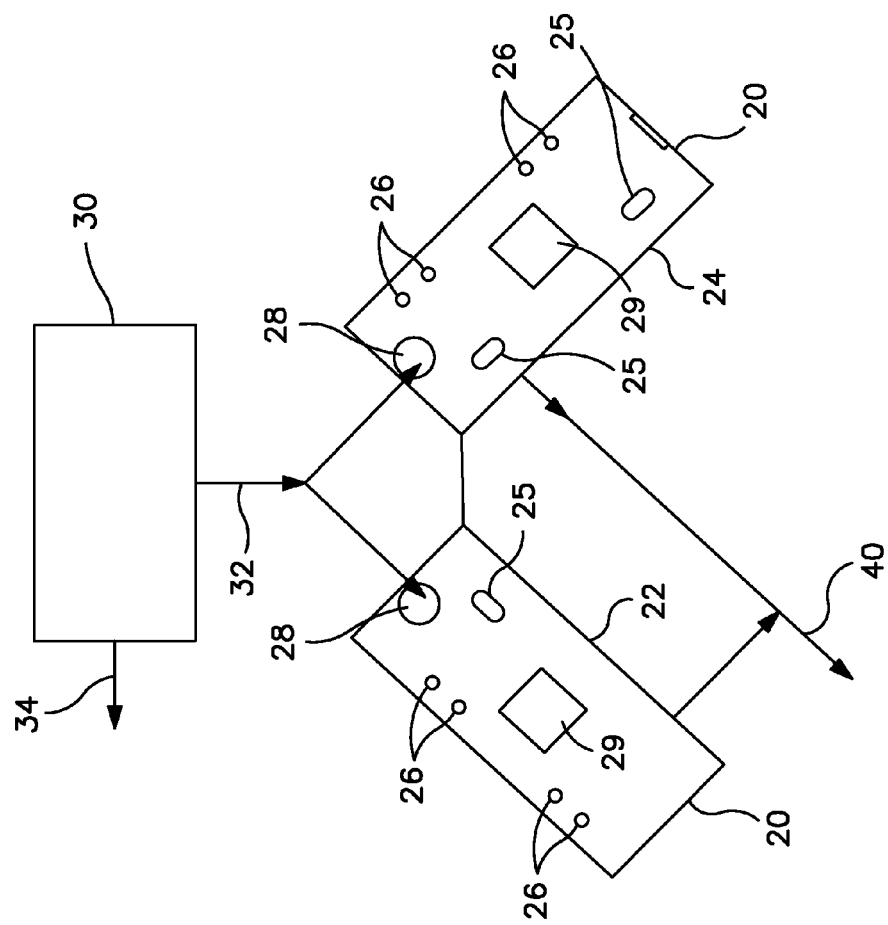
FIG. 1 is schematic illustration of a portion of the copper anode refining process, including the anode furnaces, used at the Kennecott Utah Copper facility.

As used herein, the term "coherent gas stream" or "coherent jet" means a gas stream which has little or no increase in jet diameter in the radial direction and which retains its axial velocity over a distance of at least 20 nozzle diameters as measured from the face of the jet nozzle. Such jets are formed by ejecting a gas jet through a converging/diverging nozzle and surrounding the same with a flame envelope that extends over at least a portion of the jet length, and preferably over the entire length of the jet. Similarly, the term "flame envelope" means a combusting flow formed by the combustion of a fuel and an oxidant which extends along one or more gas streams.

In a broad sense, the presently disclosed refining system and method relates in general to the application of coherent jet technology to the pyrometallurgical refining of non-ferrous metals. While the invention in its preferred embodiments relates particularly to the anode refining of molten copper, certain aspects and features of the present system and method may be equally applicable to the refining of other non-ferrous metals such as nickel, lead, zinc and tin. It is understood that there may be various amounts of ferrous metals in the melt of the non-ferrous metal refined using the techniques disclosed herein. The disclosed system and method are particularly useful, however, for the anode refining of copper and in particular for procedures for the anode refining of copper of the type wherein a copper charge is heated and/or melted and then contacted sequentially with oxidizing and reducing process gases from the same lance assembly in order to reduce the amount of sulfur and oxygen impurities therein.

The coherent jet technology involves injecting gases in the form of coherent gas jets at supersonic speeds into molten metal baths to achieve superior process benefits compared to conventional gas injection techniques. Specially designed gas injection nozzles keep the gas stream jet coherent. Coherent means preserving the jet diameter and velocity. The coherent jet delivers precise amounts of the gas stream into a molten metal bath with higher momentum, better impingement, less divergence or decay, less entrainment of ambient furnace gases, and reduced cavity formation or splashing, when compared to conventional supersonic gas jet injection. Gases delivered using the coherent jet devices impinge on the molten copper bath away from the furnace wall, which may improve furnace lining life compared with submerged tuyere gas-injection that injects gases through the furnace walls.

The presently disclosed copper refining system and method fully enables a tuyere-less copper anode refining process through the utilization of one or more multi-functional, top-blown coherent jet devices for delivering oxygen containing gas, inert or nitrogen gas, reducing agent, and a hydrocarbon fuel such as natural gas to the anode furnace and/or to the blister copper melt disposed therein. By eliminating the need for submerged tuyeres, one has eliminated the maintenance and reliability issues and costs associated with the tuyeres and significantly extend the useful life of the furnace vessel. In addition, by using the coherent jet devices to provide melting flames, the furnace is suitable to maintain the melt at the desired temperatures and even perform additional copper scrap melting which may eliminate the need and costs associated with a separate scrap melting furnace. A comprehensive understanding of current copper refining processes including Kennecott Utah Copper's continuous copper refining processes are disclosed, for example in U.S. Pat. Nos. 6,210,463 and Re 36,598, the disclosures of which are incorporated by reference.

The gases delivered to the anode furnace preferably include oxygen, natural gas, nitrogen, and mixtures thereof that are delivered according to pre-programmed set points. More particularly, the coherent jet control system consists of a gas flow control system (also referred to as a gas skid or valve train) and preferably one or two coherent jet lance assemblies. In general any desired combination of flows can be pre-programmed into the gas flow control system. Minimum gas flows or 'purge flows' through each of ports may be required to prevent nozzle occlusion and are such minimum gas flows are set and maintained by the controller whenever the coherent jet lances operate in the hot furnace.

The copper to be refined typically comprises any suitable crude copper material that contains reactable amounts of sulfur and oxygen impurities and can be subjected to the de-sulfurization and de-oxidation reactions contemplated herein. As is well understood in the copper refining art, copper typically contain sulfur and oxygen in both dissolved gaseous form as well as in chemically combined form with copper atoms, such as for example in the form of copper sulfides and copper oxides. Typically, blister copper from continuous converting contains sulfur impurities within the range of from about 800 to 6000 ppm sulfur or more prior to the oxidation step and oxygen impurities of about 2000 ppm oxygen or more. As is well known to those skilled in the art, blister copper is the product which is obtained after the smelting and converting steps of copper refining. The present system and method contemplates the direct conversion of such blister copper to anode copper. The anode copper produced typically contains less than about 50 ppm sulfur and less than about 2000 ppm oxygen.

Typically the anode furnace will comprise a rotary cylindrical furnace such as an anode furnace having a refractory lining which is optionally equipped with at least one air-fuel or oxy-fuel burner of conventional type mounted on an end wall of the converter for providing heat to the furnace, and which has been modified to contain at least one top blown, multi-functional coherent jet lance assembly. A melt of the copper is contained in the bottom of the furnace. The furnace vessel defines a headspace over the surface of the melt. The coherent jet lance assemblies are preferably mounted in the refractory wall of the furnace at a location above the surface of the copper melt and provides for the top blowing of the melt with either melting flames or the coherent gas streams.

In the disclosed embodiment, the coherent jet lances are mounted in the top of the furnace preferably at a prescribed angle to the surface of the copper melt in order to minimize splashing of the refractory wall. Optionally, the furnace may be of a bottom stirred design containing at least one porous plug disposed in the bottom of the furnace for the injection of a stirring gas such as nitrogen, argon, carbon dioxide, oxygen or combinations thereof. In addition, the furnace may also be equipped with at least one back-up or secondary tuyere for the injection of oxidizing and/or reducing gases into the melt when the coherent jet lance assembly is inoperative, although in the preferred embodiment the use of tuyeres is not favored due to the disadvantages associated therewith that have been previously enumerated.

Turning now to the drawing, FIG. 1 is a schematic illustration of the anode furnaces at the Kennecott Utah Copper facility showing an embodiment of the present copper refining system and method. The first anode furnace 22 is shown as having a single coherent jet lance port 25 whereas the second anode furnace 24 is shown as having two coherent jet lance ports 25. Although not shown, the mounting locations for the coherent jet lance assemblies are preferably adjacent to an existing platform or walkway such that no elevated work practices are required for access to the coherent jet lance assemblies. The illustrated furnaces include tuyeres 26 which are used to inject gases during traditional oxidation and reduction practices. After removal of slag 34, the blister copper 32 from the flash converter 30 is feed into the copper anode furnaces via the feed ports 28 and additional scrap copper is fed through the furnace mouth 29 where the copper undergoes much of the fire refining process, including charge melting, oxidation, skim and reduction steps. Upon completion of the fire refining process within each anode furnace, the smaller lightweight coherent jet lance assemblies, as described in more detail below, can be removed and the furnace rotated so as to tap the molten copper 40 from the anode furnace via the furnace tap hole (not shown) and on to the casting process.

Smaller, lighter weight coherent jet lance assemblies are disposed within the coherent jet lance ports 25 shown in FIG. 1. As discussed in more detail below, the coherent jet lance assemblies are used to provide melting flames during the melting of any copper scrap added to the molten charge, as well as to provide coherent gas streams during the oxidation and reduction process steps thereby reducing the oxidation and reduction cycle times as well as increasing productivity of the anode furnaces while minimizing unwanted $NO_x$ emissions.

Comparatively, when not using the coherent jet lance assemblies and technology, the anode refining process may employ conventional JL oxy-fuel burners disposed at one end 20 of each copper anode furnace 22, 24 away from the feed ports 28 to provide the required energy to the furnace during the appropriate melting or heating steps. Also, when not using the coherent jet lance assemblies, the oxidation and reduction process steps are applied to the copper within the anode furnace using submerged tuyeres 26 to introduce the appropriated gases to the copper melt.

Figure 2A:
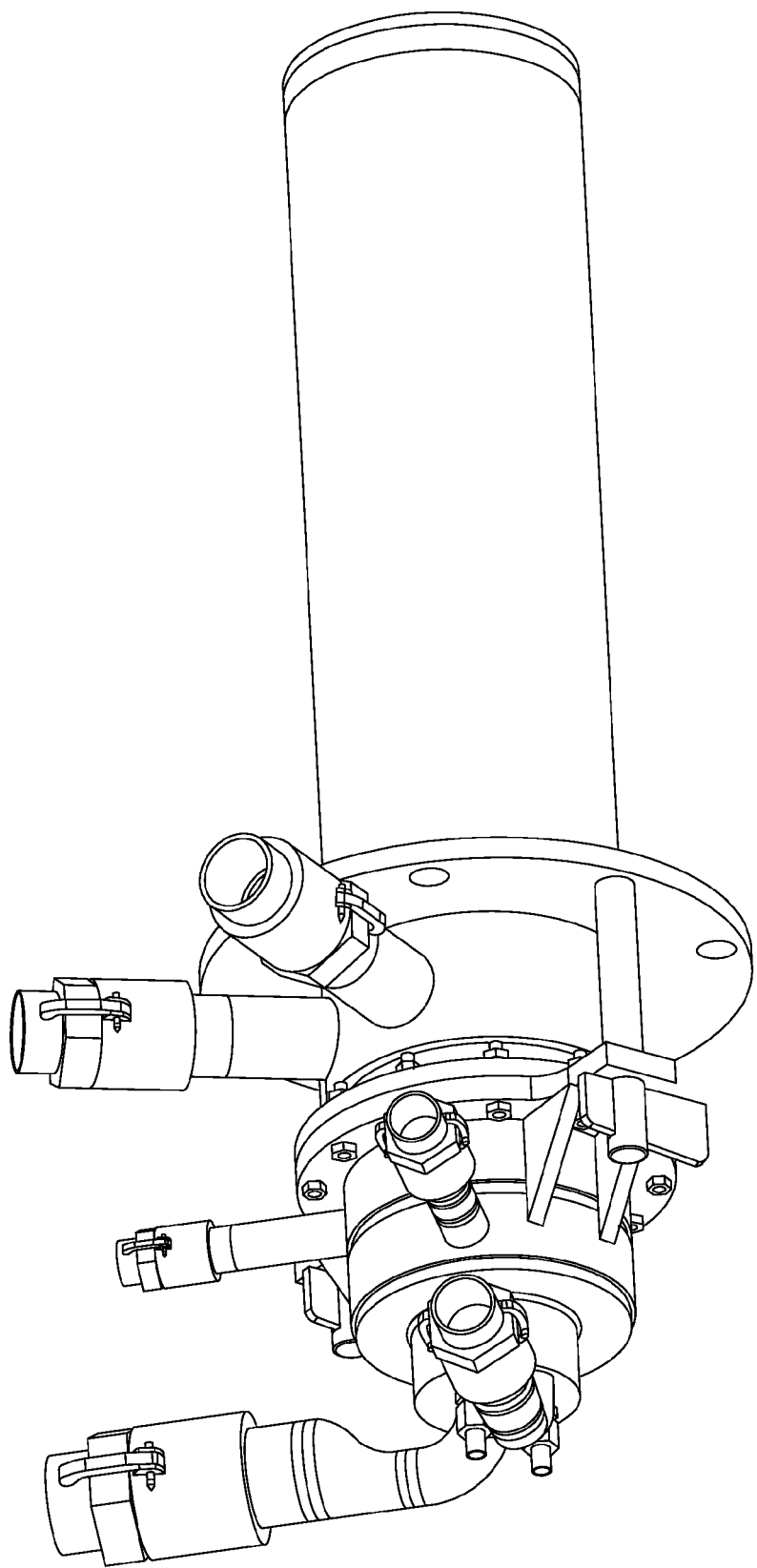

FIG. 2A shows an isometric view of a prior art coherent jet lance assembly disposed within a water cooled housing. The prior art coherent jet lance assembly has a large footprint with a maximum span or diameter of about 16 inches. The prior art coherent jet injector is preferably disposed within the water cooled housing. The entire coherent jet system with water cooled housing typically weighs nearly 400 pounds.

Figure 2B:
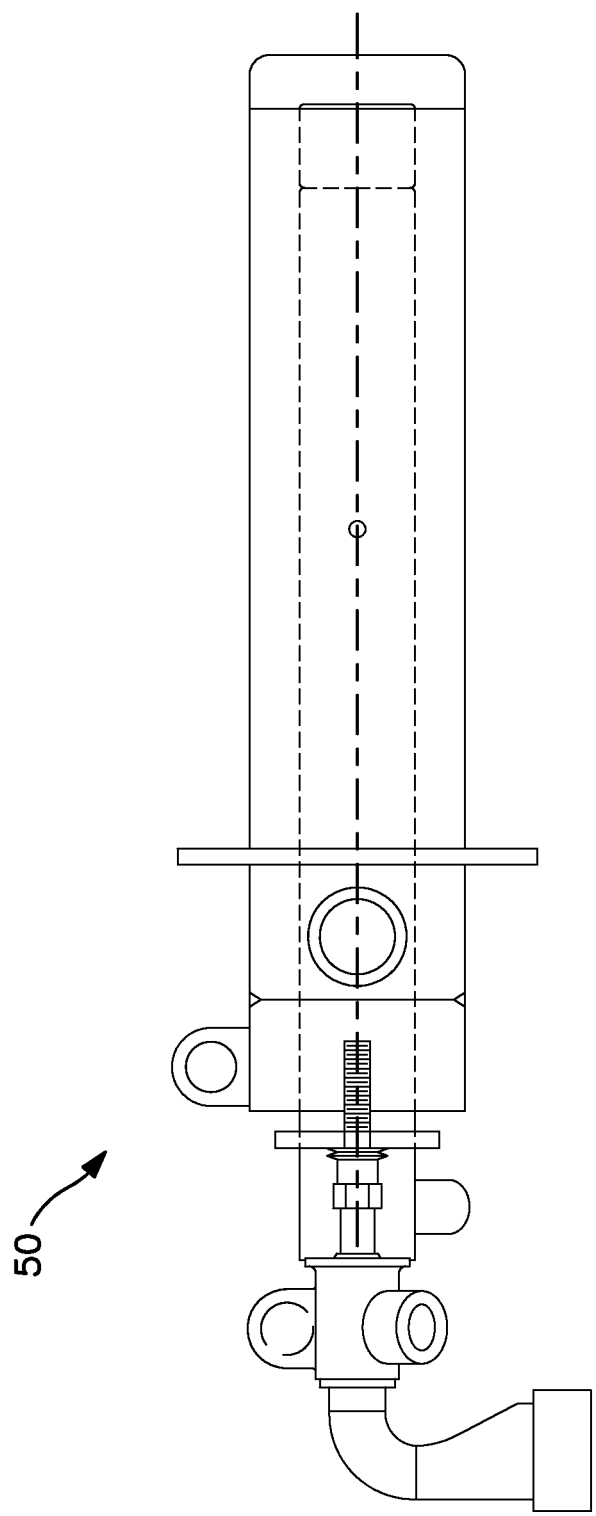
FIGS. 2B and 2C are drawings of simpler, smaller and lighter weight coherent jet lance assemblies in accordance with the present invention.
Figure 2C:
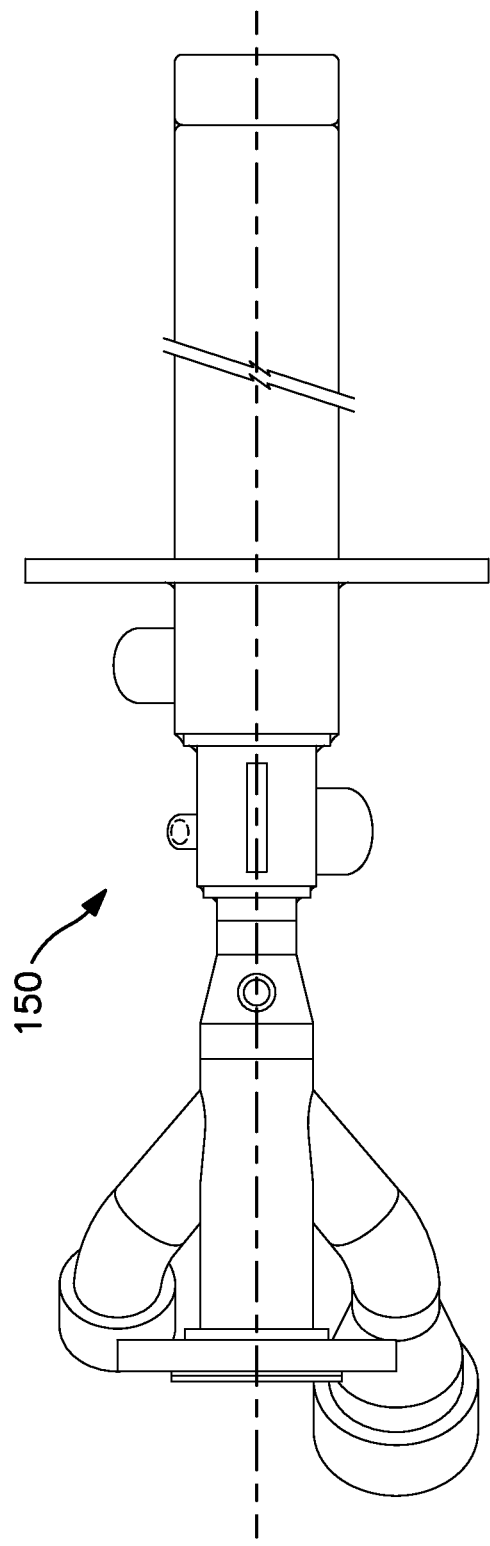

In contrast, smaller and lighter weight coherent jet lance assembly 50 used in the present copper anode refining system and method is shown in FIGS. 2B and 2C. The smaller and lighter weight coherent jet lance assembly 50, 150 is also disposed within a water cooled housing, yet has a footprint of about 37 to 48 inches in length but a maximum diameter of only about 7 inches. The slimmer coherent jet injectors have a diameter of only about 3.5 inches and the entire coherent jet systems weigh about half as much as the prior art device shown in FIG. 2A. This smaller and slimmer coherent jet lance assemblies 50, 150 allows for smaller access ports in the upper portion of the furnace vessel for easier and safer insertion and removal or the lance assembly as well as plugging of the port.

The lighter weight of the present coherent jet lance assembly together with the above-described mounting locations provide for markedly easier removal and installation of the coherent jet lance assembly within the anode furnace. The smaller diameter ports are generally easier to open and easier to plug which minimizes the safety risks associated with the furnace.

Anytime one considers the use of a coherent jet lance assembly in a furnace, the integrity of the furnace structure and, in particular the integrity of the refractory characteristics on the interior furnace surface needs to be considered. By using a smaller coherent jet lance and assembly together with the smaller lance ports, the structural and refractory problems associated with the coherent jet technology are minimized, compared to prior art lance assemblies.

The coherent jet lance assemblies are connected to sources of fuel, an oxygen-containing gas, a reducing gas and, optionally, an inert gas via a gas control skid or system (not shown). The gas control skid or system operatively controls the flow of gases to the coherent jet lance assemblies so as to selectively generate different gas streams injected into the furnace for purposes of carrying out different refining steps including copper scrap melting as well as the oxidation and reduction of the copper melt.

Coherent jet lances are adapted to produce high velocity, structured coherent gas streams in which at least one primary gas stream is ejected from a converging-diverging nozzle and is surrounded by a flame envelope which extends from the distal end of the lance assembly or lance face for at least a portion of the length of the primary gas stream and preferably extends substantially the entire length of the primary gas stream, i.e., extends from the lance face to the surface of the copper melt. The flame envelope serves to prevent the entrainment of ambient (furnace) gases into the primary gas stream and thereby inhibits velocity decay of the primary gas streams and allow the primary gas streams to impact the surface of the copper melt at distances of about 20 nozzle diameters or greater with substantial retention of the jet axial velocity. The preservation of the gas stream axial velocity enables the gas streams to substantially retain all of its momentum with a cross-sectional area that is substantially equal to that of the nozzle exit area throughout this distance, improving contact between the primary gas streams and the copper melt and hence the reaction between the coherent gas streams and the sulfur and oxygen impurities that are present in the copper melt and thereby reducing the cycle times and increasing the efficiency of the copper refining process.

The coherent jet lance assemblies differ greatly from conventional non-coherent, top-blown gas injection devices used in furnaces which do not employ a flame envelope. With such conventional top-blown gas injection devices, as the non-flame enveloped gas stream passes through the furnace atmosphere, furnace gases are entrained into the gas stream causing it to rapidly expand in the radial direction in a characteristic cone pattern, with a rapid loss of its axial velocity and momentum.

Indeed, with conventional top-blown lances or devices, this loss of axial velocity is so substantial that a stream of supersonic gas will lose it supersonic character within a short distance from the lance face. With coherent jet technology on the other hand, the coherent gas stream will substantially retain its axial velocity over distances of greater than 20 nozzle diameters, and typically from 30 to 150 nozzle diameters. Such greater length enables the coherent jet lance assembly to be mounted further from the copper melt, such as for example flush with the furnace refractory wall, without loss of process efficiency. Moreover, the substantially higher velocity of coherent gas streams enables a deeper penetration of the gases into the copper melt than is obtained with conventional top-blown, non-flame enveloped (i.e. non-coherent) gas streams. Indeed, in many cases it is believed that the coherent gas streams penetrate deeply into the copper melt before buoyancy forces cause the injected gases to turn back up, that the gas action within the melt mimics the action of subsurface injected gas, thereby eliminating the need for submerged tuyeres.

Figure 4:
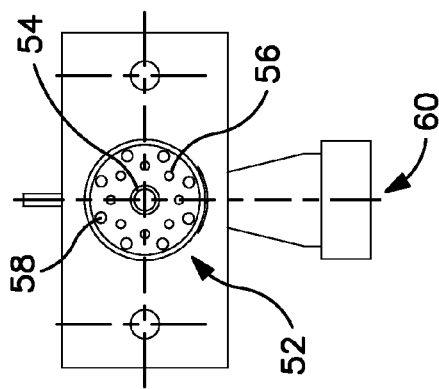
FIG. 4 is a cross-sectional longitudinal view of the coherent jet lance assembly of FIG. 3.
Figure 3:
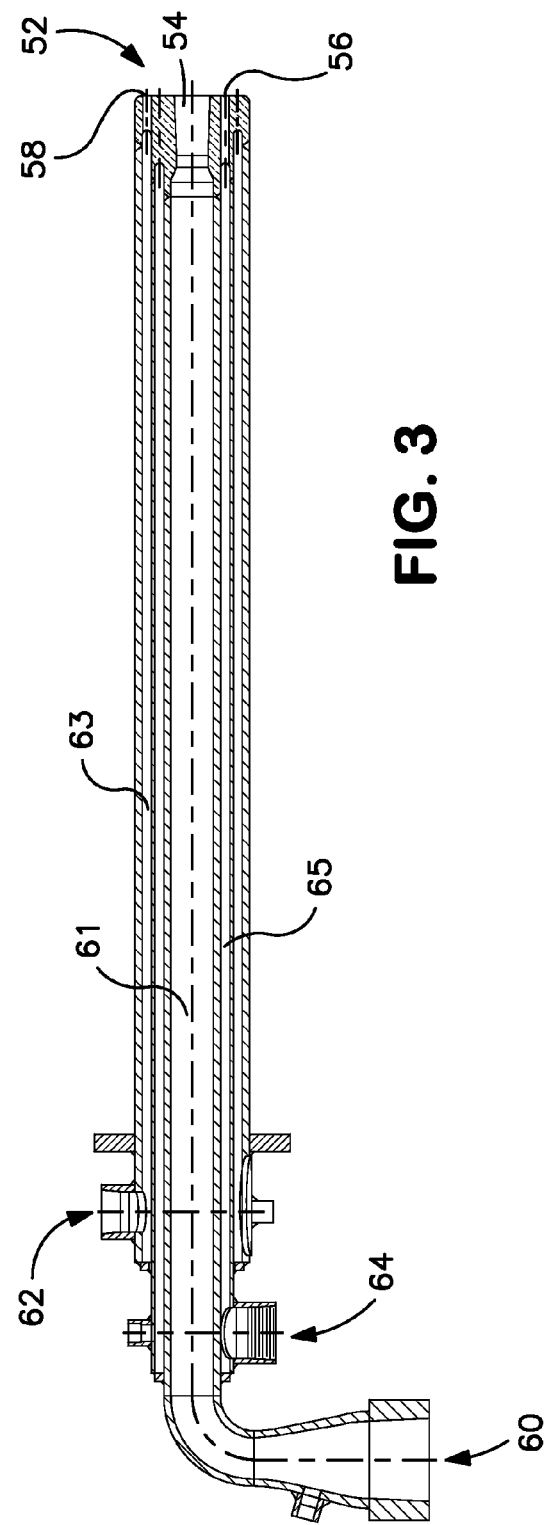
FIG. 3 is a cross-sectional end view of a coherent jet lance assembly in accordance with an embodiment of this invention.

Referring now to FIGS. 3 and 4, there is illustrated a preferred coherent jet lance injector comprising a lance face 52 having centrally disposed therein a main nozzle 54 surrounded by a concentric rings of fuel ports 56 and oxidant ports 58. Although not shown in FIGS. 3 and 4, the coherent jet lance injector is contained in a water-cooled jacket housing which is water-cooled using a flexible hose from the water jacket to the water connection. The cooling water jacket typically receives a significant flow of cooling water, a portion of which is diverted from the cooling water jacket header to the coherent jet lance assembly.

In the preferred embodiment, the fuel is preferably natural gas 64 connected to the fuel ports 56 via passages 65. Likewise, the oxidant is an oxygen-containing gas such as industrial pure oxygen 62 connected to the oxidant port 58 via passage 63. Preferably, each of the fuel ports 56 and oxidant ports 58 are disposed in an annular recess within the water cooled housing in order to minimize any blocking of the ports. The primary gas nozzle 54 is a high velocity converging-diverging nozzle appropriately sized in view of the gases and gas flows expected to be delivered with the coherent jet lance assembly 50. Nozzle 54 is preferably connected on its upstream end to one or more sources of gas 60 via a first passageway 61. While FIGS. 3 and 4 illustrate the simple and preferred injector design, alternative injector arrangements and nozzle configurations may be employed if desired. For example, dual primary gas nozzles may be employed in lieu of a single central nozzle.

Referring now to FIGS. 5 and 6, there is illustrated an alternate preferred embodiment of the coherent jet lance injector comprising a lance face 152 having centrally disposed therein about its radial midpoint a main nozzle 154 and surrounded by a single concentric ring of gas ports 155. Although not shown in FIGS. 5 and 6, the coherent jet lance injector is also contained in a water-cooled jacket housing and may also incorporate a pyrometer assembly for detecting the temperature of the melt.

In this alternate preferred embodiment, the fuel is preferably natural gas 164 connected to some of the gas ports 155 via passages 165. Likewise, the oxidant is an oxygen-containing gas such as industrial pure oxygen 162 connected to the other gas ports 155 via passage 163. Preferably, the concentric ring of gas ports 155 are arranged in an alternating sequence where gas ports 155 coupled to the fuel are adjacent disposed to gas ports 155 coupled to the oxygen and vice versa. All gas ports 155 are preferably disposed in an annular recess within the water cooled housing in order to minimize any blocking of the ports as a result of melt splashing. The primary gas nozzle 154 is a high velocity converging-diverging nozzle appropriately sized in view of the gases and gas flows expected to be delivered with the coherent jet lance injector. The primary gas nozzle 154 is preferably coupled via passageway 161 to the one or more sources of gas, including preferably a source of main oxygen 160 via coupler 172 and a source of inert gas such as nitrogen 170, via coupler 171.

The present coherent jet lance assembly is capable of generating both conventional melting flame (soft blown) and coherent gas streams surrounded by a flame envelope (hard blown). As used herein, a "melting flame" refers to a soft blown, non-lancing flame (referred to as a "bushy flame" in the oxy-fuel burner art) having broad surface coverage. Such flames are produced by adjusting the flows of fuel and oxidant such that a flame is produced which spreads in the radial direction and loses its supersonic character within a distance of about 20 nozzle diameters from the distal end of the nozzle or lance face. As the name implies, such flames are employed preferably for the melting of solid copper and other charge materials such as copper scrap, since they provide a large amount of heat over a large surface area for melting the charge material. In the present embodiments, the gas streams used during such melting are substantially nitrogen free to minimize the formation of $NO_x$. The melting flames can also be used to maintain the temperature of the copper melt within the prescribed range during any 'Hold/Idle' and 'Burner' operating modes.

Preferably, in the generation of melting flames, the flow of gas to the primary gas nozzle is throttled back from high flow, supersonic velocity conditions to a reduced flow which is at least sufficient to prevent clogging of the nozzles (referred to herein as a "purge flow"), although if desired, high velocity gas flow through the nozzle may be continued, but without the flame envelope, to produce a hybrid melting/lancing flame. The present system and method contemplates the use of either bushy and hybrid flames, and the same are subsumed under the general term "melting flame".

Fuels suitable for use with the present system and method include most hydrocarbon fuels, such as natural gas, hydrogen gas, and liquid fuels but most preferably natural gas. Useful oxidants include oxygen-containing gas and preferably industrial grade high-purity oxygen gas. Preferably, the flows of natural gas and oxygen-containing gas are adjusted so that the total flow of natural gas and oxygen-containing gases are evenly split between the primary nozzle and the secondary ports, respectively, when the coherent jet lance assemblies are operated in the 'Burner Mode' (e.g. melting flame mode).

A microprocessor based PLC controller is operatively coupled to the coherent jet devices to precisely control the supply of gases to the coherent jet lances in a plurality of different operating modes (e.g. Hold/Idle Mode, Burner Mode, or Refining Mode) and in response to user commands and furnace operation conditions. The actual gas flows are typically dictated by the operating mode and the specific refining process steps being carried out (e.g. cold blister heating or scrap melting, oxidation, reduction, slag skimming, etc.) Selection of the operating modes and detailed process steps employed by the present coherent jet system are preferably made by the anode furnace operators via a touch screen human machine interface in a control room or control station.

The primary process goal of the present copper anode refining system and method is to provide energy to the anode furnace for expanded or increased copper scrap melting while remaining beneath the smelter NO limit and lowering the overall oxidation and reduction cycle times. In other words, the aim of the current system and method is to achieve the best balance between operating costs, energy efficiency, cycle-time and lowest achievable NO formation. Typical copper furnace operations include the steps of (i) charging; (ii) melting; (iii) oxidizing; (iv) reducing, (v) slag skimming; and (vi) casting. Detailed process steps for the above-identified refining process steps using the present coherent jet process are discussed in more detail below.

Charing & $NO_x$ Control

As discussed above, the present system and method provides an improved low $NO_x$, copper anode refining process where coherent jet lance assemblies are employed to sequentially receive molten blister copper and charge scrap, melt a copper charge, de-sulfurize the melt, optionally slag skim the melt, de-oxygenate the melt and optionally provide heat to the melt to assist in the casting process. In the first step of this process, a melt of copper is provided in the furnace. Generally this copper melt will take the form of a heel of molten copper remaining from a previous refining operation, which is maintained in molten form via heat provided from a burner or alternatively from the coherent jet lance assemblies. To this heel, solid copper is charged to the furnace over a fill time of about 7 to 10 hours. Where desired, cold copper scrap may also be charged to the furnace in an amount which comprises on a weight basis a minor portion of the total charge. The solid scrap may be charged to the furnace in one, or more preferably, in several steps.

During charging of the furnace with its attendant opening of the furnace door, the contents are exposed to the ambient atmosphere, resulting in the formation of large amounts of $NO_x$. Indeed, it has been discovered that NO generation during the charging step is the largest single source of NO formation during the overall anode refining process. A significant decrease in the amount of overall process $NO_x$ formation can be achieved by suppressing the formation of $NO_x$ during the charging step when using the present lance assembly operated in the 'Hold/Idle Mode'.

It has been unexpectedly found that $NO_x$ formation may be significantly and unexpectedly reduced by injecting nitrogen gas into the furnace headspace via the coherent jet lance assemblies. In one embodiment, nitrogen gas, oxygen gas and a natural gas stream are ejected via the nozzle into the head space of the furnace. While not wanting to be bound by any particular theory or mode of operation, it is believed that this nitrogen gas stream quenches the high temperature zone which exists in the headspace that drives $NO_x$ formation, leading to a reduced level of $NO_x$ formation. In one sense, this result is counterintuitive since one would have expected that the ejection of nitrogen gas into the headspace and exposed to high temperature would have instead increased the amount of $NO_x$ formation.

During the charging and $NO_x$ suppression step, the gas flows are maintained under low flow conditions sufficient to at least purge the lance passages of occluded material and prevent blockage of the lance due to splashing of the molten copper. During any $NO_x$ suppression step, the main nozzle is preferably employed to provide a slightly higher flow of a nitrogen gas stream for $NO_x$ suppression. The flow of nitrogen gas is typically less than about 10,000 scfh, and preferably about 9,000 scfh is ejected from the primary nozzle while flows of oxidant and fuel are ejected from secondary ports at lower flow rates than used during the oxidation and reduction steps. This mode of operation is phrased the 'Hold/Idle Mode'.

While the $NO_x$ suppression step has been described with respect to the charging of the furnace with copper material, it has been found that the use of nitrogen or other quenching gas stream for $NO_x$ suppression is equally applicable during other phases of the refining process whenever high $NO_x$ levels are encountered during the refining process. For example, the $NO_x$ suppression technique disclosed herein may also be used whenever the refining procedure is producing undesirable amounts of $NO_x$ during other phases of the refining operation by periodically or temporarily switching the coherent jet lances from other operating modes to the above-described 'Hold/Idle Mode' and then injecting the nitrogen or other quenching gas stream into the furnace headspace at reduced flow rates until the furnace $NO_x$ level is reduced. Such $NO_x$ control strategy is preferably an automatic feature programmed into a microprocessor based PLC controller.

Melting

After charging, melting of the charge is preferably carried out through the heat generated by the coherent jet lance assembly at a temperature and for a length of time sufficient to produce and maintain a melt temperature of about 1200° C. to 1250° C. For this purpose, the gas flows to the coherent jet lance assemblies are oxygen-containing gas and fuel and would preferably be substantially nitrogen free. The gas flows are adjusted in known manner to provide a melting flame which is ejected from the coherent jets lance assembly into the furnace headspace and optionally, into contact with the copper charge.

The melting flame provides for quick melting of the solid charge to form the molten copper melt. Typically, the charge will be contacted with the melting flame for at least a portion of the period required for charge melting and preferably for the entire period required to melt the charge. During this process step, the present coherent jet system and method operate in what is phrased the 'Burning Mode'. This 'Burning Mode is characterized by lower flow velocities of the gas streams from the lance assembly and is typically operative during the melting process and the casting process.

After melting the charge, the present coherent jet system and method generally operates in what is phrased the 'Refining Mode'. The 'Refining Mode' is characterized by high velocity, shielded gas flows from the lance assembly. The Refining Mode is selected during much of the oxidation process, reduction process as well as the slag skimming process. The gas composition of the main nozzle gas flow depends on the active process step (e.g. oxidation, slag skimming, or reduction) being performed.

Oxidation

After melting of the charge, the resulting copper melt is then top blown with a coherent oxygen-containing gas stream to de-sulfurize the melt and oxidize the sulfur present therein to $SO_2$. The coherent oxygen-containing gas stream may comprise up to 100 volume % oxygen with only trace amounts of other gases. In practice, the coherent oxygen-containing gas stream ejected from nozzle may comprise a mixture of oxygen and nitrogen containing at least 21 volume % oxygen, more preferably at least 36 volume % oxygen. The coherent oxygen-containing gas stream typically has an axial (i.e., in the flow direction) velocity of from about 1.0 to 2.5 Mach, and preferably from about 1.5 to 2.25 Mach and more preferably from about 1.8 to 2.0 Mach, and is produced by adjusting in known manner the flows of oxygen from the secondary oxidant ports, fuel (e.g., natural gas) from the secondary fuel ports, and oxygen from main nozzle such that a flame envelope is produced around the main oxygen stream for at least a portion of the length of the main oxygen gas stream, and preferably over the entire length of the main oxygen gas stream.

Typical flow conditions during the oxidation step include a fuel flow of from about 5,000 scfh to 7,000 scfh, a secondary oxygen flow of from about 4,000 scfh to 5,000 scfh, and a primary oxygen-containing gas flow of from about 45,000 scfh to 60,000 scfh total flow. Top blowing of the copper melt with the coherent oxygen-containing gas stream is performed at a melt temperature of from about 1200° C. to about 1250° C. and is continued for a length of time sufficient to reduce the amount of sulfur present in the melt from, for example, about 800-3,000 ppm (on a weight basis) to about 40 to about 100 ppm sulfur.

The de-sulfurization step may be conducted as a single step procedure as described above, or, optionally, it may be conducted as a multi-step procedure where in a first step the copper melt is top blown with a coherent oxygen-containing gas stream having a higher oxygen concentration, and in a second and subsequent steps, the copper melt is top blown with a coherent oxygen-containing gas stream having lower oxygen concentrations. This multi-step operation may have advantage of avoiding over oxidation of the copper melt. In the contemplated multi-step procedure, the copper melt is first top blown with a coherent oxygen-containing gas stream having an oxygen concentration of from about 30 to 60% by volume with the balance comprising inert gas, preferably nitrogen. Thereafter, the amount of oxygen present in the oxygen-containing gas is decreased to about 21% to about 36% by volume (with the balance comprising inert gas, preferably nitrogen) and the copper melt is top blown with the lower concentrations of coherent oxygen-containing gas stream until the sulfur concentration is reduced to a desired level such as for example from about 40 ppm to about 100 ppm sulfur. If desired, of course, less top blowing with the higher oxygen concentration coherent gas stream and more top blowing with the lower oxygen concentration coherent gas stream may be employed in subsequent steps in order to lessen the possibility of over oxidation of the melt, although the amount of time required to complete the desulfurization phase of the refining process may increase accordingly.

Flow conditions for the multi-step oxidation procedure generally correspond to those for the one step procedure and include, for example, a fuel flow of from about 5,000 scfh to 7,000 scfh, a secondary oxygen flow of from about 4,000 scfh to 5,000 scfh, and a primary oxygen-containing gas stream from nozzle of about 45,000 scfh to 60,000 scfh total flow.

Slag Skimming

Following oxidation of the copper melt with the coherent oxygen-containing gas, the melt may be subjected to an optional slag skimming step. While not essential to the practice of the presently disclosed system and method, slag skimming may be periodically desirable in order to prevent the accumulation of slag in the furnace during the continuous or semi-continuous operation of the copper anode furnace. In this step, the furnace is rotated about its longitudinal axis so that the slag may be removed through the mouth of the furnace. In order to provide a motive force to the slag, the coherent jet lance assemblies may be employed to top blow the copper melt to raise a slag on the surface thereof and direct the slag in the direction of the furnace mouth. While any suitable primary gas stream may be used for this purpose, it is preferred to employ an inert gas, such as nitrogen, or an oxygen/nitrogen gas mixture as the top blown gas stream. As before, the top-blown gas stream is formed by ejecting a supersonic flow of a primary gas stream from the nozzle and surrounding it with a flame envelope formed by combustion of oxygen and fuel through the ports.

Reduction

After oxidation and optional slag skimming, the copper melt will typically contain about 3,000 to 7,000 ppm by weight of oxygen, for example around 4,000 ppm oxygen. In contrast, the oxygen level of the blister copper at charging will typically comprise about 2,000 ppm oxygen. Thus, the oxygen level of the copper melt has been significantly increased by the oxidation step over initial values. In order to reduce the oxygen present in the melt to acceptable levels, the melt is then top blown by the coherent jet lance assemblies with a reducing gas, such as hydrogen, natural gas, a hydrocarbon, carbon monoxide and ammonia, in order to de-oxygenate the copper melt and reduce the amount of oxygen present in the copper melt to a desired value. Preferably, the oxygen level in the copper melt is reduced from about 4,000 ppm by weight after desulfurization to about 1,500 to about 1,900 ppm oxygen, and preferably around 1,500 ppm oxygen.

Typical melt (reaction) temperatures during the reduction step will range from about 1170° C. to about 1180° C. As with the oxidation process, the reduction process can be implemented in one or more steps or sub-processes employing coherent reducing gas flows having different gas concentrations.

The coherent reducing gas stream is formed by ejecting a supersonic flow of a primary reducing gas stream from the nozzle and surrounding it with a flame envelope formed by combustion of secondary oxygen and fuel through the secondary ports on the lance face. The coherent reducing gas stream may comprise up to 100% reducing agent (e.g., natural gas). Preferably the coherent gas stream comprises a mixture of reducing agent and an inert gas such as argon, steam, nitrogen, helium and $CO_2$ (of which nitrogen is most preferred) containing from about 5 volume % reducing agent to about 25 volume % reducing agent and more preferably from about 10 volume % reducing agent to about 20 volume % reducing agent, with the balance comprising inert gas such as nitrogen. Such reducing agent/inert gas mixtures are preferably formed by adjusting the flows of natural gas and nitrogen to the coherent jet lance assemblies by the gas control skid or system so that a mixture of natural gas and nitrogen is ejected from the main nozzles.

It has been found that the use of a mixed reducing agent/inert gas stream for the coherent reducing gas stream during reduction accrues certain operational advantages. In particular, it has been found that due to their low molecular weight (i.e. mass), gas streams consisting solely or primarily of reducing agents form coherent gas streams of only limited length and jet force. Indeed, due to their low mass, a coherent gas stream of only reducing agents may not have sufficient jet force to pierce the copper melt and promote adequate gas/liquid mixing of the reducing agent with the copper melt. To overcome this problem, the conventional means for the introduction of reducing agents into the melt was often only achieved by supplementing the top-blown reducing agents with porous plugs and submerged tuyeres or strictly introducing the reducing agents using submerged tuyeres.

Advantageously, inert gas streams form excellent coherent gas streams of useful length and jet force due to their higher mass. By using a mixed reducing agent/inert gas stream, the operational problems associated with the sole use of top-blown reducing agents can be overcome. By mixing the reducing agent (e.g. natural gas) with a flow of nitrogen gas or other inert gas, the nitrogen gas or other inert gas acts as a carrier gas or propellant to transport the reducing agent to the copper melt with a high jet force sufficient to enable efficient gas/liquid mixing and eliminate the need to supplement the injection of reducing agents with porous plugs or submerged tuyeres.

Casting

Upon completion of the reduction steps, the resulting anode copper will typically contain about 15 ppm or less sulfur, 1,900 ppm or less oxygen and have a melt temperature in range of about 1200° C. At this point the anode copper is ready for casting into anodes for subsequent electrolytic refining. In order to provide heat to maintain the melt temperature during the casting operation, in the preferred embodiment the copper melt may be top blown with a melting flame from the coherent jet lances in like manner as described above with respect to the copper charge melting step, with the flows of primary oxygen-containing gas, secondary oxygen and fuel being adjusted to provide a slight stoichiometric excess of fuel on the order of, for example, about 3 to about 5 volume percent. By using such a fuel rich melting flame, re-oxidation of the melt is minimized. During this casting step, the present coherent jet system and method operate, if at all, in the 'Burning Mode'.

EXAMPLES

Table 1 depicts the ranges of gas flows contemplated for use with the present copper anode refining system and method for a commercial scale operation.

TABLE 1

Typical Lance Assembly Gas Flows

| Gas Flows (SCFH) | Charging Hold/Idle Mode | Melting Burner Mode | Oxidation Refining Mode | Reduction Refining Mode |
|---|---|---|---|---|
| Secondary Ports - Oxygen | Purge flow | 4700-9300 | ~4000 | ~4000 |
| Secondary Ports - Fuel (NG) | Purge flow | 2500-5000 | ~5000 | ~5000 |
| Main Nozzle - Oxygen | 0 | 4600-9300 | ~20000 to 30000 | 0 |
| Main Nozzle - Nitrogen | ~5000-10000 | 0 | ~25000 to 35000 | ~40000 to 55000 |
| Main Nozzle - Reduce Agent/Fuel | 0 | 2500-5000 | 0 | ~5000 to 15000 |
| Main Nozzle - Oxygen/NG | N/A | 7100-14300 | N/A | N/A |
| Main Nozzle - Oxygen/Nitrogen | N/A | N/A | ~45000 to 65000 | N/A |
| Main Nozzle - NG/Nitrogen | N/A | N/A | N/A | ~45000 to 70000 |

The presently disclosed copper anode refining system and method was evaluated in an anode furnace of Kennecott Utah Copper, a commercial scale copper anode furnace. Comparative results showing the performance of the anode furnace using the present copper anode refining system and methods employing the coherent jet technology against the performance of the anode furnace using the traditional copper anode refining process employing an oxy-fuel end-burner (i.e. JL Burner) and submerged tuyeres are presented in Table 2.

TABLE 2

Copper Refining at Kennecott Utah Copper (West Furnace)

| Refining Process Characteristics | Traditional Process JL Burner & Tuyeres | Refining Process with Co-Jet |
|---|---|---|
| Fuel Consumption | 7930 NCFH | 8480 NCFH |
| Oxygen Use | 12290 NCFH | 14140 NCFH |
| Oxygen Content - Blister Copper | 2900 ppm | 3100 ppm |
| Sulfur Content - Blister Copper | 3100 ppm | 2500 ppm |
| Oxygen Content - Start of Oxidation | 1768 ppm | 2560 ppm |
| Sulfur Content - Start of Oxidation | 1029 ppm | 620 ppm |
| Oxidation Time | 113 minutes | 62 minutes |
| Reduction Time | 52 minutes | 58 minutes |
| Total Oxidation + Reduction Time | 165 minutes | 120 minutes |
| Copper Scrap (Average per Charge) | 10 Tons/Charge (1.4 Tons/Hour) | 34 Tons/Charge (4.7 Tons/Hour) |
| NOx Emissions | 35.5 lbs/hour | |

As expected, the overall fuel consumption and oxygen consumption increased when using the present copper anode refining system and method employing the coherent jet technology. Specifically, the fuel consumption rose from a baseline of 7930 NCFH of natural gas to 8480 NCFH of natural gas, an increase of about 7%. Oxygen consumption increased from 12290 NCFH to 14140 NCFH, an increase of about 15%. However, the increased costs of the natural gas and oxygen were offset by greatly increased copper production. In particular, the copper scrap melting was increased from about 10 tons per charge using the traditional copper anode refining process to 34 tons per charge using the new copper anode refining system and methods employing the coherent jet technology, an increase of about 240%. In addition the cycle times associated with the oxidation and reduction steps was reduced from a total of 165 minutes under the traditional process to 120 minutes using the coherent-jet based process, a reduction of 27%.

Also, by using the new copper anode refining system and methods employing the sequential delivery of oxidizing and reducing process gases from the same coherent jet lance assembly with intervening purge, the sulfur content in the melted blister copper at two selected points was markedly reduced compared to the corresponding sulfur content in the melted blister copper traditional process. As expected, the oxygen content in the coherent jet based process was slightly increased due to the increase in oxygen supplied to the furnace in the present copper anode refining system and method. This excess oxygen also accounts for the slight increase in reduction time needed to remove the excess and unwanted oxygen.

Equally important is that the present coherent jet based system and method, as demonstrated at the commercial scale copper anode furnace, effectively controlled the $NO_x$ levels below the prescribed levels during the entire process.

From the foregoing, it should be appreciated that the disclosed embodiments and examples provides various methods and systems of copper anode refining. Although the invention has been described in detail with reference to certain preferred embodiments, as will occur to those skilled in the art, numerous other modifications, changes, variations, additions and omissions can be made without departing from the spirit and scope of the instant claims.

What is claimed is:

1. A method for the anode refining of copper comprising the steps of:
   (i) charging molten blister copper to a furnace;
   (ii) charging copper scrap to the molten blister copper in the furnace;
   (iii) melting said copper scrap or heating the molten blister copper using a melting flame produced from a top blown, multi-functional coherent jet lance, wherein said melting flame is a soft blown, non-lancing flame which spreads in the radial direction and loses its supersonic character within a distance of 20 nozzle diameters from the distal end of the lance face, said coherent jet lance coupled to an oxygen-containing gas source, and a fuel source;
   (iv) oxidizing sulfur impurities in the molten blister copper in the furnace using a top-blown, coherent oxygen-containing gas stream ejected from the coherent jet lance, said coherent jet lance coupled to the oxygen-containing gas source and the fuel source; and (v) reducing oxygen in the molten blister copper in the furnace using a top-blown, coherent reducing gas stream containing a reducing agent and an inert gas ejected from the coherent jet lance; said coherent jet lance coupled to the oxygen-containing gas source, the fuel source; a source of the reducing agent; and a source of the inert gas.

2. The method of claim 1 wherein the method of anode refining of copper is a continuous fire refining process and the method further comprises the steps of repeating steps (iii) through (v) for each additional charge of copper scrap or molten blister copper introduced to the furnace.

3. The method of claim 1 further comprising the step of directing one or more purge flows through the multi-functional coherent jet lance; after the oxidizing step and prior to the reducing step; after the melting or heating step and prior to the oxidizing step; during the charging steps; during the melting step; or after the reducing step.

4. The method of claim 1 wherein the oxidation step is conducted in two or more sub-steps in which the molten copper is contacted with a first coherent oxygen-containing gas stream having an oxygen concentration of at least 30 volume percent oxygen in a first step and the molten copper is subsequently contacted with a second coherent oxygen-containing gas stream having a lower concentration of oxygen than said first coherent oxygen-containing gas stream.

5. The method of claim 1, wherein the reducing agent and fuel are natural gas and the inert gas is nitrogen.

6. The method of claim 1, wherein the melting flame is substantially free of nitrogen gas.

7. The method of claim 1 further comprising the step of heating said molten copper during casting of the copper into anodes by contacting said molten copper with a melting flame produced by said coherent jet lance.

8. The method of claim 1 further comprising the step of skimming slag from the molten copper using a gas stream ejected from the coherent jet lance to direct the slag in the direction of a furnace mouth.

9. The method of claim 1 further comprising the step of suppressing the formation of $NO_x$ in the furnace by injecting nitrogen gas into the furnace headspace using the coherent jet lance during the charging step.

10. A method for inhibiting the formation of $NO_x$ during the refining of metals comprising the steps of:
    providing a charge of scrap metal to a molten metal bath in a furnace equipped with at least one top blown lance assembly and coupled to an oxygen-containing gas source, a fuel source, and a nitrogen gas source;
    melting said scrap metal charge using a melting flame using the fuel and the oxygen containing gas;
    oxidizing or reducing impurities in the melt using the oxygen-containing gas or reducing agents; and
    intermittently injecting prescribed volume of nitrogen gas into the furnace headspace using the top blown lance assembly during or after the step of providing a charge of scrap metal to inhibit the formation of $NO_x$ during the refining process.

11. An improvement to the method for continuous refining of copper in an anode furnace, the improvement comprising the steps of:
    charging molten blister copper to the anode furnace and optionally charging copper scrap to the molten blister copper in the anode furnace;
    oxidizing sulfur impurities in the molten blister copper in the anode furnace using a top-blown, coherent oxygen-containing gas stream ejected from a coherent jet lance mounted in a refractory wall of the anode furnace at a location above the top surface of the molten blister copper, said coherent jet lance coupled to an oxygen-containing gas source and a fuel source; and
    reducing oxygen in the molten blister copper in the anode furnace using a top-blown, coherent reducing gas stream containing a reducing agent and an inert gas ejected from the coherent jet lance; said coherent jet lance coupled to the oxygen-containing gas source, the fuel source; a source of the reducing agent; and a source of the inert gas.

* * * * *